United States Patent

Loverdos-Stelakatos

[15] 3,680,516

[45] Aug. 1, 1972

[54] SYSTEM ABSORBING SHOCKS ON VESSEL AND IMPROVING ITS MOTION

[72] Inventor: Constantine Loverdos-Stelakatos, 5 Dimitriou Vassiliou Str., Neon Psychicon, Athens, Greece

[22] Filed: Aug. 13, 1970

[21] Appl. No.: 63,428

[30] Foreign Application Priority Data

Aug. 3, 1969 Greece..........................40812

[52] U.S. Cl. ...............................................114/67 R
[51] Int. Cl. .................................................B63b 1/34
[58] Field of Search.........................................114/67

[56] References Cited

UNITED STATES PATENTS 3,161,385 12/1964 Kramer......................114/67 R
3,459,147 8/1969 Ismay..........................114/67 R
2,349,584 5/1944 Arnstein et al..............114/67 X
3,352,118 11/1967 Burkhardt....................114/67 X

*Primary Examiner*—Andrew H. Farrell
*Attorney*—Gilbert B. Gehrembeck

[57] ABSTRACT

A compressible cushion is fixed on the hull of a boat or a vessel absorbing water-wave shocks and improving the hull flow; it may be fixed in a cavity of the hull. Some joints are described. The form of the compressible cushion will be such as to optimize shock absorption and flow conditions; it may also have adjustable compressibility. A compressible cushion attached to a rigid piece of material similar to a part of the hull forms a system easily attached to the hull.

8 Claims, 17 Drawing Figures

SYSTEM ABSORBING SHOCKS ON VESSEL AND IMPROVING ITS MOTION

The present invention relates to a system absorbing sea-wave shocks on a boat or a vessel and improving its motion.

During the motion of speedy light vessels there are always shocks on them because of the sea-waves. To date the shock-absorbence has been achieved only in small boats, whose hulls are made entirely of inflated air-chambers. However, the inflatable boats are small enough to be unsuitable for trips and also they are not comfortable. It is also desirable to change the form of the hull of a vessel during its motion according to its speed, weight, and sea-conditions, so that minimum resistance to its motion is obtained; however, this can be achieved only in boats of special construction.

An object of this invention is to overcome these disadvantages.

According to this invention compressible cushions of appropriate shape are placed on the areas where the sea-waves knock the vessel. The compressible cushion must be designed in such a way that the hull having these cushions will acquire hydrodynamic shape. Moreover, the compressible cushions' design must provide an improved hull flow.

The invention will be described by way of example with reference to the accompanying drawings, wherein.

Figure 7:
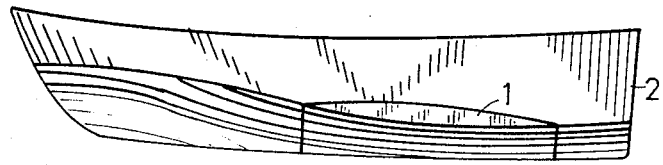
Figure 8:
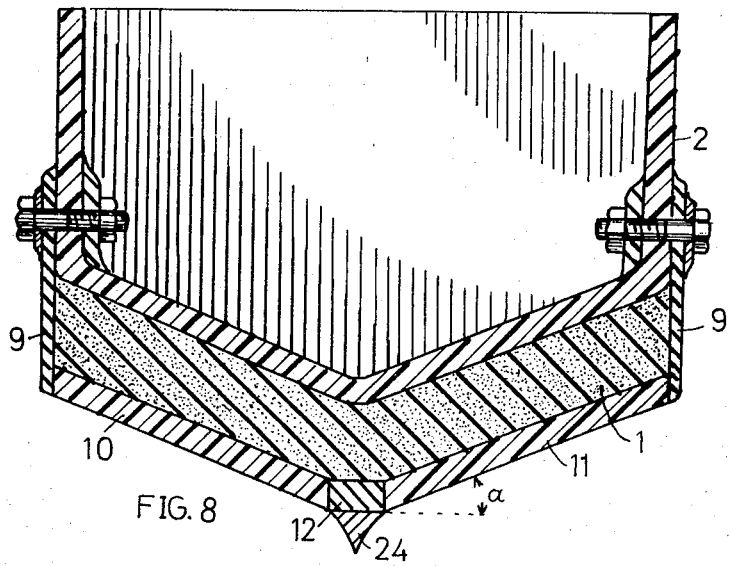
Figure 9:
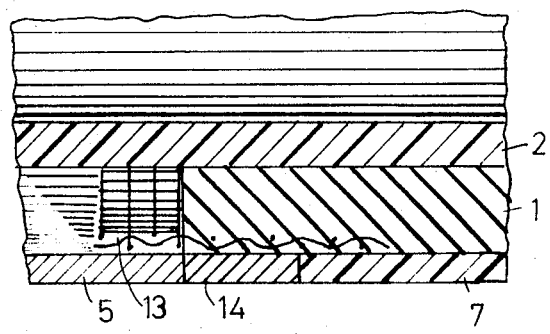
Figure 10:
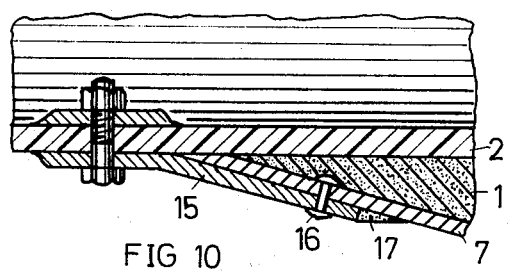
Figure 11:
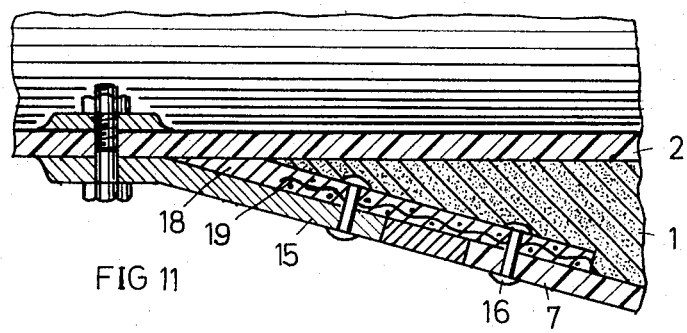
Figure 14:
Figure 12:
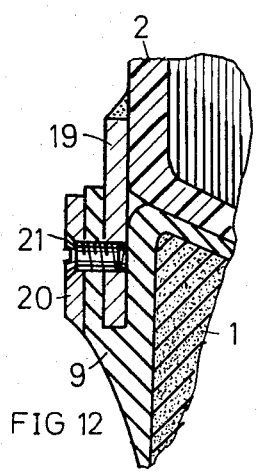
Figure 13:
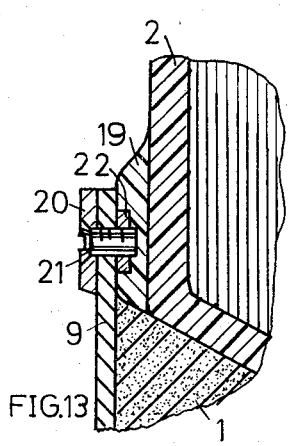
Figure 15:
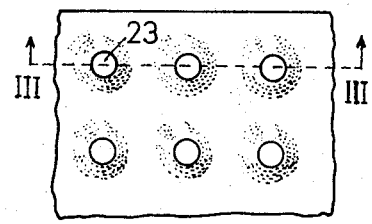

FIG. 7 is a front view of a boat having compressible cushion mounted in a cavity of the hull FIG. 8 is a transverse section of a boat with a compressible cushion under a larger scale FIGS. 9, 10 and 11 are sections of joints connecting the compressible cushion with the hull, under a larger scale FIGS. 12 and 13 are sections of joints connecting the compressible cushion with the sides of the hull FIG. 14 is a transverse section of the compressible cushion shown in FIG. 15

FIG. 15 is a plan view of a part of a compressible cushion

Figure 16:
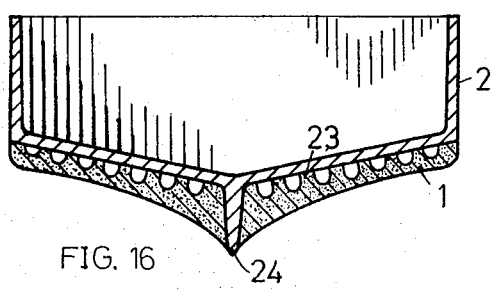

FIG. 16 is a transverse section of boat with a compressible cushion

Figure 17:
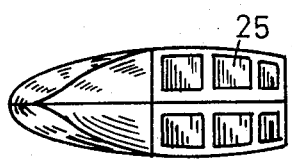

FIG. 17 is a view of the bottom of a boat having compressible cushions covered with rigid plates.

The compressible cushions consists either:

a. of a layer of a foam-material (e.g. foam-rubber), covered with a waterproof sheet. Or b. of one or more air-chambers. The air-chambers are made of a sheet of plastic or rubber material and are filled with air under pressure. If there are more than one chambers, they may be interconnected so that the air can circulate between them. It is desirable that the air-chambers shall be interconnected in pairs: each pair consists of two air-chambers placed symmetrically with respect to the plane of symmetry of the vessel (passing through the keel of the vessel); in that case any loss of air-pressure in any twin chambers does not cause any disturbance in the stability of the vessel.

The compressible cushion can also be made according to any usual way of construction of compressible mattresses covered with a flexible waterproof material; e.g. the compressible cushion may be made of spiral springs.

The compressible cushions may be wrapped in a plastic or rubber sheet, so that a continuous cushion is formed.

One or more compressible cushions are properly secured to the hull of the boat or vessel.

Figure 1:
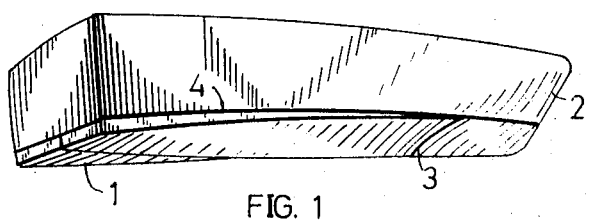
FIG. 1 is a perspective view of a boat having a compressible cushion

In FIG. 1 a compressible cushion 1 is placed on the hull 2. Its shape is thin near the prow and becomes thicker aft; it is fixed on the hull near the prow by means of the joint 3 and, in addition, to the sides of the hull 2 with the joint 4.

Figure 2:
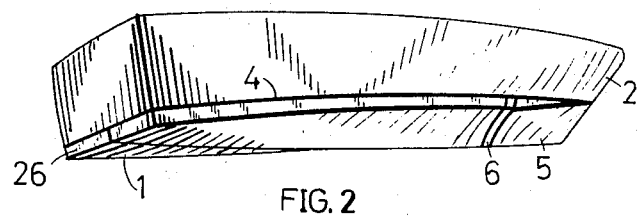
FIG. 2 is a similar view of a boat having a compressible cushion with different mounting

In FIG. 2 the compressible cushion 1 is attached to a rigid front piece 5 with a joint 6; this piece 5 has similar form as the prow and is made of a rigid material (e.g. the same material the hull 2 is made of, as wood, metal, reinforced plastic, etc.). Thus a better mounting is obtained and the hydrodynamic shape is preserved.

Figure 4:
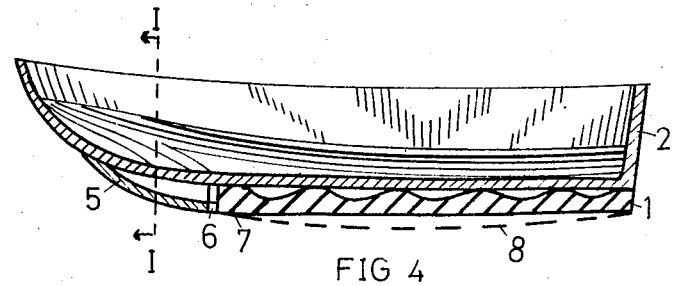
FIG. 4 is a longitudinal section of the boat shown in FIG. 2

FIG. 4 is a longitudinal section of a boat, and shows the compressible cushion 1 connected to the said piece 5 by means of the joint 6.

Figure 3:
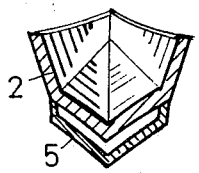
FIG. 3 is a transverse section of the boat of FIG. 4 along the line I—I

FIG. 3 is a section of the boat along the line I—I.

Figure 5:
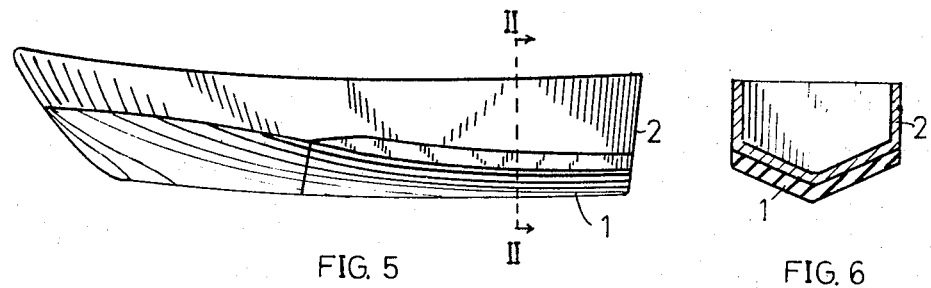
FIG. 5 is a front view of a boat having compressible cushion mounted in a cavity of the hull
Figure 6:
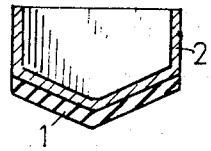
FIG. 6 is a transverse section of the boat shown in FIG. 5

In FIGS. 5 and 7, the compressible cushion 1 fits to a cavity formed on the hull 2 in the place where the waves knock it. FIG. 6 shows a section of the boat along the line II—II.

The surface of the compressible cushion 1 in contact with the hull 2 can have swellings that they contribute to the shock's absorbence, as shown in the FIG. 4.

The external cover of the compressible cushion may be flexible or rigid. If the compressible cushion is made of springs or other compressible means, then the external cover must have sufficient thickness and/or rigidity in order to avoid the formation of local distortion of the external surface due to the application of concentrated forces. The forces applied on the external surface of the compressible cushion are vertical to it, due to water pressure, as well as tangential, due to skin friction. In order to resist these forces the external cover of the compressible cushion must be properly designed. Thus, if this external cover is flexible, it must be thick enough and it must be made of a plastic material or rubber with incorporated steel wire or fabric, nylon fiber or any other strong fiber, it must also have sufficient rigidity in order to avoid the formation of ripples or waves during the motion of the vessel; such waves, having a wavelength much smaller than the wave length of the water-waves, or ripples generally increase the resistance to the motion of a boat or vessel. On the opposite, the formation of waves having wave-length of the same order of magnitude as the sea-waves is desirable because the hull changes shape and follows the form of the water surface; thus the resistance to the motion of the vessel decreases.

The external cover of the compressible cushion may be rigid in the parts where it is necessary to maintain a constant shape; in that case it can be made of wood, plywood, reinforced plastic, metal, etc. or any other material used in the construction of the hulls. In FIG. 8 is shown a section of the boat (as in FIG. 6). The bottom of the compressible cushion is made of a rigid material, while the side-covers 9 are made of a flexible material having enough thickness and rigidity so that the formation of waves or ripples is avoided. The bottom of the compressible cushion, as shown in FIG. 8, is constructed from two solid parts 10 and 11; the said parts may have the same shape as that part of the hull 2 close to which they are. The two pieces 10 and 11 are connected with a flexible joint 12 which consists of an elastic material (such as rubber) glued or fixed otherwise to the rigid pieces 10 and 11; it can also be made entirely of a bonding material having appropriate strength such as the polysulfide elastomers (thiokel). A sharp keel 24 may be attached to the elastic joint. In case a force, acting on the joint, is producing stresses exceeding the strength of the materials used, the joint is reinforced by steel-wire, nylon fiber, fabric, or any fiber having enough strength each reinforcing material being incorporated in the rubber or plastic material; the said reinforcement (steel-wire, etc.) may also be incorporated in the bonding material (thiokol). The bottom of the compressible cushion can be constructed from one piece of rigid material (instead of the two pieces 10 and 11 shown in FIG. 8). In that case the dead-rise (i.e., the angle $a$ shown in FIG. 8) does not change during a shock and a better shock-absorption is achieved; if it is made of two pieces, the angle $a$ decreases during the shock and the shock-absorbence is less effective, especially for larger vessels, but the flow conditions are better and the resistance to the motion decreases.

FIG. 9 is a section, under a larger scale, of the flexible joint 6 shown in FIGS. 2 and 4, with which the rigid piece 5 is connected to the external cover 7 of the compressible cushion; it is constructed in the same way as the joint described above. The larger part of the tangential forces applied on the compressible cushion are transferred to the hull by means of this joint; in order to resist these forces, steel-wire 13, chain, nylon rope, or any other strong fiber or fabric may be fixed on the joined parts 5 and 7. FIG. 10 is section, under a larger scale, of the joint 3 of FIG. 1; a piece of rigid material 15 (such as metal, reinforced plastic etc.) is bolted to the hull 2, and the external cover 7 of the compressible cushion 1 is fixed to it with rivets 16 or bolts and strong adhesives (e.g. epoxy resins); a bonding material 17 (e.g. thiokol) is used to form a connection with hydrodynamic properties.

FIG. 11 is a section, under a larger scale, of the joint 3 of FIG. 1. The difference from FIG. 10 is that a rigid external cover 7 has been joined to the hull 2. A sheet of plastic material or rubber 18 with incorporated steel-wire 19 (or fabric, or nylon fiber, etc.) is used to transmit the forces from the cover 7 to the rigid piece 15. In all above mentioned joints it may be possible to use additional reinforcement as in FIG. 9. The piece of the rigid material 15, shown in FIG. 10, and FIG. 11, can be constructed as an integral part of the hull.

The reinforcement either incorporated in the rubber (or in the bonding material) or not, it may be connected to the joined parts loosely, i.e. when a tangential force is applied on the joint, the rubber or bonding material 14 (FIG. 9) resists this force and expands; before the expansion limit and/or the permissible stress of said bonding material or rubber is reached, the reinforcement (wire etc.) is stretched and the force is applied on it. In this way longitudinal vibrations will be absorbed.

The connection of the external cover to the sides of the hull can be made in several ways. FIG. 8 shows such a connection, where the cover 9 is bolted to the hull 2; if the hull is thin, or, generally, if it is not desirable to open holes in it, then another attachment is made as shown in FIGS. 12 and 13. In FIG. 12 a metallic strake 19 is glued to the hull 2 and the flexible cover 9 of the compressible cushion 1 is fastened by means of another strake 20 and the screw 21. In FIG. 13 a strake 19 (having the nut 22) is fixed on the hull 2 by using a proper adhesive; another strake 20 serves to fasten the flexible cover 9 of the compressible cushion 1 by means of the screw 21.

During the motion of the boat or vessel the external surface of the compressible cushion is distorted, because of the water pressure on it. As the water is flowing relative to this curved surface of the compressible cushion, it undergoes a directional change downward and its momentum is changed. Because of this change of momentum the mean pressure transmitted by the water per unit surface is larger than in the case of a plane surface; The result is that a smaller wetted surface is necessary for the same lift. The increase of water pressure near the bottom of the boat (or vessel) improves the operating conditions of the propeller and the resistance to the motion is decreased (due to the decrease of the friction forces and to the decrease of the angle of incidence, i.e. the angle between the horizontal plane and the keel). At the region where the pressure is near maximum (stagnation point), it may be necessary to have a lesser compressibility than in the rest cushion in order to avoid the formation of a curved surface of small radius of curvature (like a cavity). Generally, it is possible to vary the compressibility and the shape of the compressible cushion so as to obtain the minimum shock from sea-waves during the motion of the vessel and the optimum flow conditions, depending on the velocity of the vessel, its weight, and sea-conditions. If the compressible cushion is made of independent air-chambers, the compressibility and the external form may be adjusted by varying the air-pressure in the different chambers.

If the compressible cushion is made of foam-material or other compressible system such as springs, then the compressibility of the compressible cushion may be influenced either by the characteristics of the compressible material or system (e.g. foam-material, springs) or the thickness of the flexible cover. The compressible cushion may also have such a shape that, taking into consideration the pressure distribution on it during the motion of the vessel, a shape optimizing shock-absorption and/or flow conditions is obtained. In FIG. 4 the dotted line 8 shows the initial shape of the bottom of the compressible cushion; an initial concave surface may also be desirable.

In FIG. 16 is shown a transverse section of the boat as in FIG. 6. The compressible cushion is made of a compressible foam-material having swellings. In FIG. 15 is shown a piece of the said foam-material and in FIG. 14 its section along the line III—III. The foam-material may be attached directly to the hull using a strong adhesive at the top of the swellings 23 shown in FIG. 14, FIG. 15 and FIG. 16. Such a construction permits the free circulation of the air within the compressible cushion, thus increasing the compressibility of it. The external cover may be such as described before or, instead of it, a waterproof flexible lamination may be used having enough strength as the external cover described before; said lamination may be constructed of a layer of a bonding material (such as thiokol) in which is embedded one or two sheets of glass-fiber mesh. The external cover, or the lamination, will be attached to the keel 24, shown in FIG. 16, and to the sides and the front of the hull.

FIG. 17 shows the bottom of a boat with compressible cushion; the external cover of the compressible cushion consists of plates of rigid material (like wood, plywood, reinforced plastic, metal, etc.) which are connected with flexible joints (like these shown in FIG. 8); in that case, the cover is made of six plates 25. However, it is also possible to have a larger or smaller number of plates. A variation of this construction is to attach the rigid plates on the internal surface of the flexible cover.

In the above mentioned cases where the cover of the bottom of the compressible cushion is formed by rigid plates (either joined with elastic joints or attached to a flexible sheet) the compressible cushion can change shape during the motion of the vessel so as to improve the flow conditions reducing also the shocks from the sea-waves; the appropriate change of shape can be achieved by varying the air-pressure, in the case of air-chambers, or by choosing the compressibility of the compressible material or system (foam-material, springs) and/or the thickness of the flexible cover depending on each case.

Another construction of a system for absorbing shocks on a vessel and improving its motion is the following: A piece of rigid material is constructed using a proper material (such as reinforced plastic, metal); said piece of rigid material must have the same form as that part of the hull to which the compressible cushion should be applied, or larger than the said part of hull, but it may have less thickness than the said part of the hull. Such said part may be the lower part of the hull, shown in FIG. 1 and in FIG. 2, till the line 4 (i.e. the chine of the boat). The internal surface of said piece of rigid material must fit to the external surface of the corresponding part of the hull of the boat. The compressible cushion with its external cover, as described before, is attached to said piece of rigid material using strong adhesives and/or bolts, and/or rivets; said piece with the compressible cushion is attached to the hull of the boat using convenient sockets or joints having the possibility to be connected and disconnected easily. Thus, this system for absorbing shocks on a vessel and improving its motion is independent of the boat and can be attached or removed from it easily.

Exhaust outlets may be provided in all above mentioned compressible cushions so as the air of the compressible cushion can escape in case that the said compressible cushion is not made of air-chambers; thus a smooth shock absorption is achieved. This can be done by using one or more tubes having a cross-section of such magnitude as to permit the escape of the compressed air. The end of the tube or tubes should be above the water-level and have a valve to inhibit the entrance of water inside the compressible cushion. The tubes may be connected to the compressible cushion at a place 26 near the stern of the vessel, shown in FIG. 2, and attached to the transom.

In case that a compressible cushion is made of air-chambers, or, generally, if the air within the compressible cushion must have almost constant pressure, then the above mentioned exhaust outlets will be connected to an air-chamber placed in the vessel and having a volume larger than the volume of the compressible cushion, in order to decrease the variation of the air-pressure during the motion of the vessel.

What is claimed is as follows:

1. A resiliently compressible cushion for attachment to the hull of a boat in position for absorbing sea-wave shocks, comprising an inner flexible and resiliently compressible portion having at least one air chamber and a water resistant outer covering including at least one rigid segment, and means for attaching said cushion to a said hull.

2. Cushion of claim 1 wherein said inner portion is a continuous resiliently compressible rubbery foam.

3. A boat hull having attached thereto, at a position at least partially below the water-line, a cushion as defined in claim 1.

4. The hull of claim 3 wherein said cushion is disposed in a cavity of the hull.

5. The hull of claim 3 including a plurality of said rigid segments flexibly interconnected.

6. Cushion of claim 1 wherein said outer covering includes a plurality of rigid segments flexibly interconnected.

7. Cushion of claim 1 wherein said compressible portion is covered with a water resistant flexible covering forming a watertight compartment.

8. Cushion of claim 7 wherein said outer covering includes a plurality of rigid segments flexibly interconnected.

* * * * *